June 3, 1930.  L. AUGUSTE ET AL  1,761,768
APPARATUS FOR CUTTING THREADS APPLICABLE TO ALL HORIZONTAL LATHES
Filed Nov. 5, 1923  2 Sheets-Sheet 1
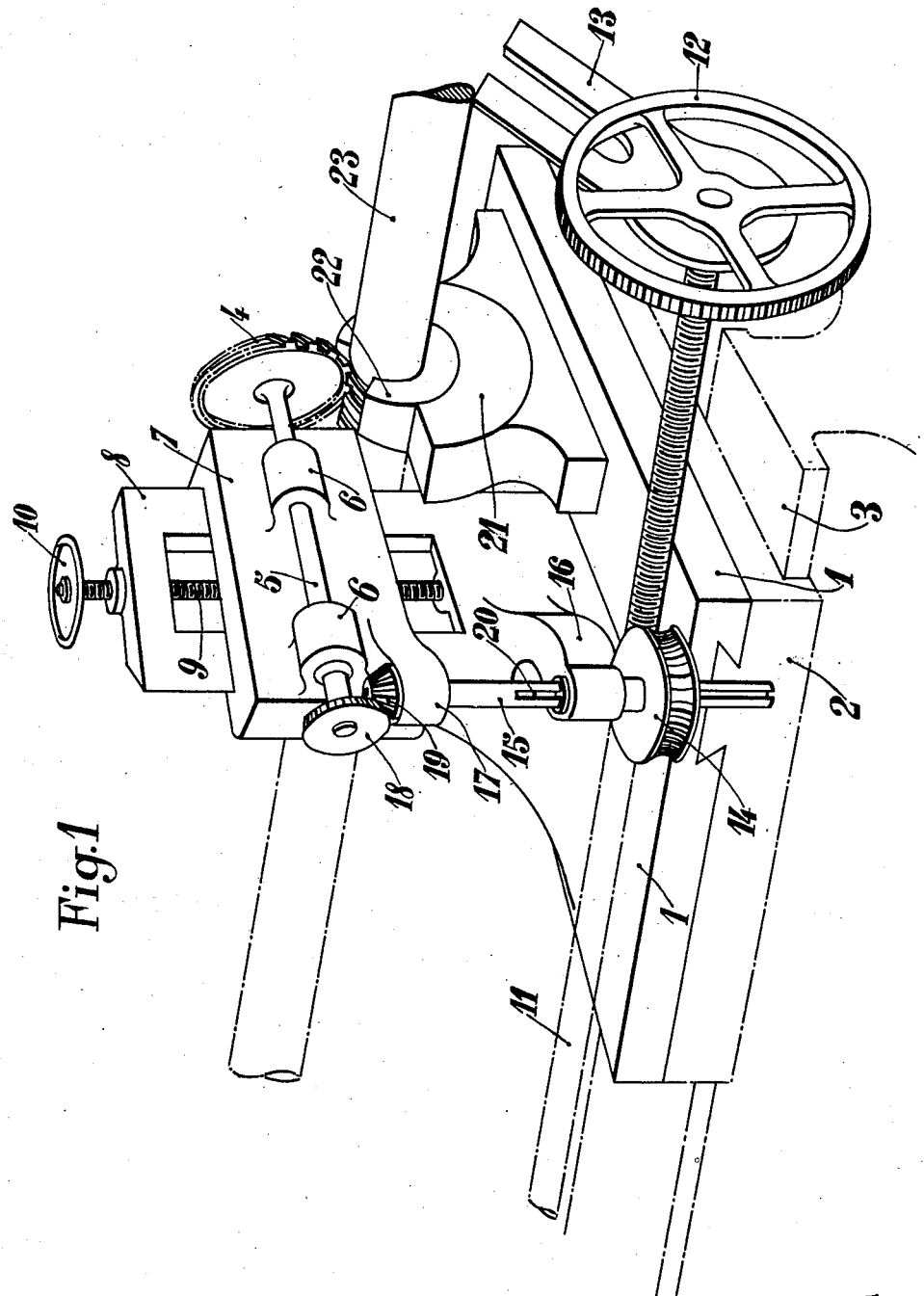
Inventors
L. Auguste
R. des Moutis
By Marks & Clerk
Attys.

June 3, 1930. L. AUGUSTE ET AL 1,761,768
APPARATUS FOR CUTTING THREADS APPLICABLE TO ALL HORIZONTAL LATHES
Filed Nov. 5, 1923 2 Sheets-Sheet 2
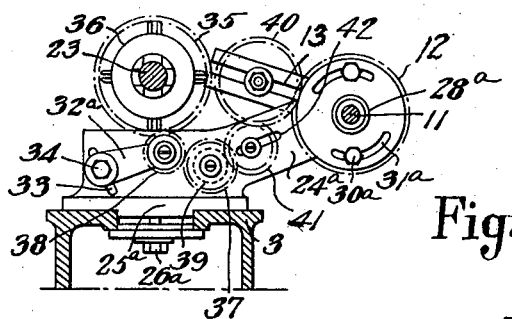
Fig.5
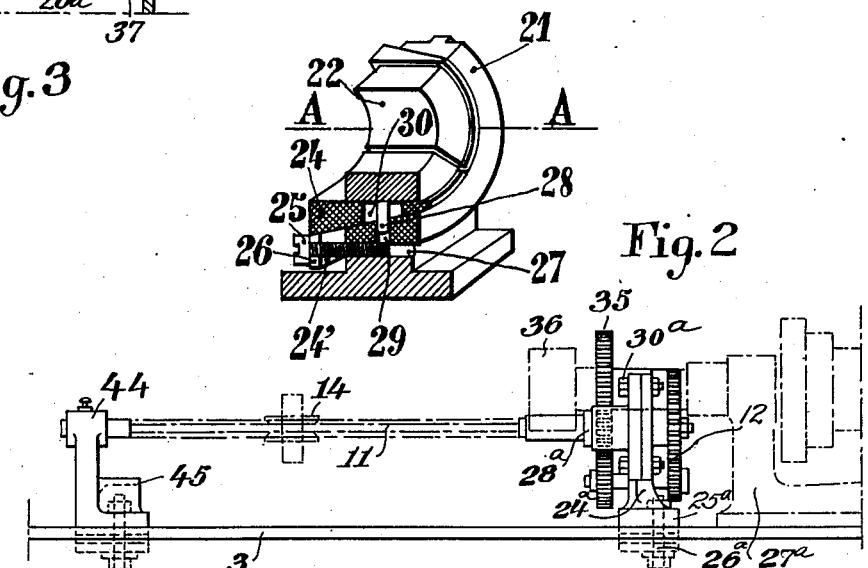
Fig.3
Fig.2
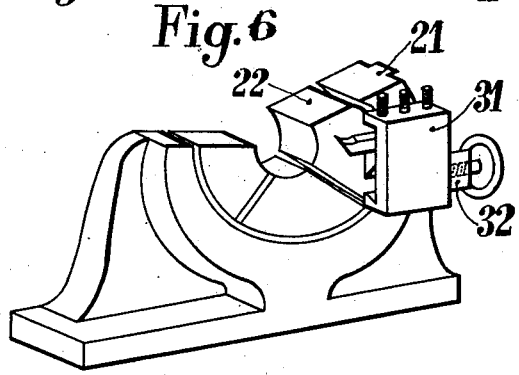
Fig.6
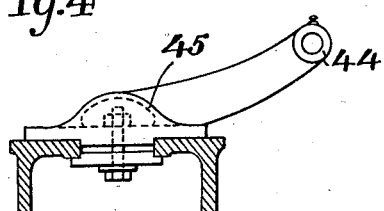
Fig.4
Inventors
L. Auguste
R. des Moutis
By Marks & Clerk
Attys.

Patented June 3, 1930

1,761,768

UNITED STATES PATENT OFFICE

LÉON AUGUSTE AND ROBERT DES MOUTIS, OF PARIS, FRANCE

APPARATUS FOR CUTTING THREADS APPLICABLE TO ALL HORIZONTAL LATHES

Application filed November 5, 1923, Serial No. 672,980, and in France April 17, 1923.

Machines for cutting threads are known in which the tool, receiving both a rotary movement about its axis and a translation parallel to the axis of the thread to be cut, effects in a single cut the cutting of a screw having a simple or multiple thread.

These machines are complicated and, consequently, costly and their use is justified only in case the needs of the production of threads ensure to the said machines a continuous work.

This invention relates to a simple and cheap apparatus capable of being applied to all types of horizontal lathes and permitting to use eventually the latter for the cutting of threads with the same output as the machines specially intended for this work.

The advantages of such an apparatus are obvious owing to the fact that its application on the lathe does not necessitate more time than is necessary for the operator for choosing the gears suitable for the thread to be turned. As far as the output is concerned, it is exactly that of the thread-cutting machines of the type indicated above.

The accompanying drawing illustrates a form of construction of this apparatus.

Fig. 1 is a somewhat diagrammatic perspective view.

Fig. 2 is an elevation of the mechanism for driving the feeding screw of the apparatus.

Fig. 3 is an elevation of the gear train connecting the lathe shaft with the feed screw of the thread cutting apparatus.

Fig. 4 is an end elevation of the end support of the screw feeding the thread cutting apparatus.

Fig. 5 is a perspective view with axial section of the cradle supporting the bar to be cut.

Fig. 6 is a perspective view of a cradle as illustrated in Fig. 1, but showing a tool-carrying carriage secured to one of its side faces.

The apparatus comprises a base 1 which is mounted on the tool carriage 2 of a lathe the bed of which is shown at 3. The base 1 can thus, in the known manner used in horizontal lathes, be moved at right angles and parallel to the bed 3. The circular tool 4 for cutting the thread is rigidly mounted at the end of a spindle 5 guided in the bearings 6 of a slide-block or tool support 7 capable of moving at right angles to the plane of the bed 3 along a slide 8 rigid with the base 1. This movement of the slide-block is obtained by the screw 9 the operating hand wheel 10 of which can constitute, by means of a suitable index and graduation, the apparatus for measuring the displacements, that is to say in the present case, the depth of the screw threads.

The continuous rotary movement of the rotary tool 4 is obtained by starting from a worm gear 11 one of the ends of which is engaged by a gear 12 connected by a train of gears, of suitable ratio, mounted on the usual quadrant for adjustment plate 13. This worm gear 11, arranged parallel to the lathe bed, is supported in the bearings of any suitable supports such as 28$^a$ and 44 secured in a suitable manner on the lathe bed as shown in Fig. 2.

The worm gear 11 gears with a tangent wheel 14 rigidly mounted on the vertical shaft 15 held in bearings one of which 16 belongs to the slide 8 and the other 17 to the slide-block 7 and which transmits its movement by means of a pair of bevel pinions 18 and 19 to the spindle 5 carrying the rotary tool. The angular connection between the tangent wheel 14 and the vertical shaft 15 is obtained by a key moving in a longitudinal groove 20 of the said vertical shaft 15, so as to permit the adjustment in height of the tool-carrying slide-block.

The apparatus is completed by a stay having a cradle 21 rigid with the base 1 and a half-bearing 22 which moves along the bar 23 to be cut and constantly supports the latter opposite the region with which it engages the rotary tool 4.

With its essential elements thus described, the apparatus operates in the following manner:

The rotary tool 4 is so chosen that its teeth correspond to the pitch and profile of the threads to be cut on the bar 23, which is mounted between centers on the lathe or according to one of the methods currently used in turning work. The train of gears on the quadrant or adjustment plate is also chosen according to the pitch to be obtained. The slide-block 7 is caused to move down so that it engages with the bar 23 according to the given depth of the threads.

The carriage 2 is then moved on as usual parallel to the bar 23 and the tool 4 rotates, moving in translation for progressively cutting the threads throughout the length of the bar 23.

A support 24ᵃ has its base 25ᵃ mounted on the bed 3 of the lathe in the customary manner for the purpose of attaching the movable head-stocks and the like on the lathe. A bolt 26ᵃ locks the support 24ᵃ at any desired point on the bed. This headstock is placed near the fixed support 27ᵃ of the lathe and the support 24ᵃ comprises, on the one hand, a bearing support 28ᵃ for one of the ends of the leading screw 11, and on the other hand, two pinion quadrants or adjustment plates. The quadrant 13 may be pivoted concentrically with respect to the axis of the leading screw 11, and may be fastened in the selected angular position by means of bolts 30ᵃ which extend through slots 31ᵃ of the support 24ᵃ and corresponding openings of the quadrant 13. A second quadrant is formed by an arm 32ᵃ one of which has a lug which engages a groove 33 of the support 24ᵃ and may be fastened by means of a bolt 34, for example.

Mounted on the lathe shaft is a suitable gear 35 which is located behind or to the right of the center point of the fixed headstock or of the chuck 36 for operating the bar 23 to be cut. It is apparent that, by means of pinion quadrant 32ᵃ and 13, it is possible to connect the lathe shaft and the leading screw 11 by means of a gear train suitable for the work to be done. The wheel 35 drives a pinion 37 having a fixed axis through the intermediate pinion 38 of the small quadrant 32ᵃ. A pinion 39 keyed on the axle of the pinion 37 may operate the wheel 40 mounted on the arm of the quadrant 13 by means of the intermediate pinion 41 whose axle is mounted in a slot 42 of the support 24, so as to be adjusted to any desired position. Finally, the wheel 40 engages with the gear 12 keyed on the leading screw 11 to be driven.

The leading screw 11 is supported in a bearing 44 forming part of a support 45 which is affixed to the lathe bed in the same manner as the support 24.

The traveling stay has in detail the shape shown in Figs. 5 and 6.

The bearing 22 is made of several independent parts, or, in case it is used for screw threading bars of small diameters, it is made in one piece radially recessed to a sufficient depth for being subjected to resilient distortions and it acts in the same way as the clamp dogs of an expanding mandrel.

The elements of the bearing 22 are cylindrical internally and externally and respectively rest on the upper surface of correspondingly shaped wedges 24 the lower conical face of which bears on the corresponding face of the cradle 21.

Each of the wedges 24 is provided with a shoulder 24′ on which bears the head of a screw 25 which passes therein through a radial opening 26 and is screwed in a screw threaded bore 27 provided in the cradle 21 parallel to the axis A—A which must correspond to that of the bar to be cut. The bearing elements 22 are transversely held relatively to the cradle in any suitable manner which does not prevent their radial displacements. In particular for that purpose, use may be made of the following device. Each element 22 is provided on its lower face with a radial finger or claw 28 which fits in a corresponding hole 29 provided in the body of the cradle 21.

This finger passes through the wedge in a longitudinal opening 30 of sufficient dimensions for permitting the suitable relative movements of the bearing and wedge.

It will immediately be seen that by screwing or unscrewing the screws 25, radial displacements of the bearings are obtained and, consequently, a variation of the diameter of the cylindrical surface which bears on the bar to be cut.

Fig. 6 shows a tool-carrying carriage 31 which can slide in the known manner on a slide 32, rigid with the cradle 21, or secured on the latter in any suitable manner. Four tools, opposed two by two can also be arranged on the cradle 21 and operating two above and two below, in order to effect at the same time as the cutting of a bar, its gauging, or, when the slide-block is at rest, its slicing.

What we declare as our invention and desire to secure by Letters Patent is:

1. A thread cutting attachment for lathes having a carriage and driving means, comprising a base member mounted on said carriage, a tool support slidably mounted on said base member, means for adjusting the tool support vertically with respect to said base member, a horizontal shaft mounted in said support, a cutting tool on said shaft, a feed screw, gears connecting said screw to said lathe driving means for rotation in timed relation thereto, a worm driven by said screw, and gearing connecting said tool shaft to said worm.

2. A screw threading attachment as claimed in claim 1, one of the gears for driving the tool shaft being secured to a vertical shaft, said shaft being displaceable axially with respect to said worm, and means for rotating said shaft with said worm.

In testimony whereof we have signed our names to this specification.

LÉON AUGUSTE.
ROBERT des MOUTIS.